(12) United States Patent
Kobayashi et al.

(10) Patent No.: US 10,947,985 B2
(45) Date of Patent: Mar. 16, 2021

(54) PRESSURE SENSOR DEVICE AND ELECTRIC PUMP

(71) Applicant: Nidec Tosok Corporation, Zama (JP)

(72) Inventors: Yoshiyuki Kobayashi, Zama (JP); Shigehiro Kataoka, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 16/320,511

(22) PCT Filed: Jul. 24, 2017

(86) PCT No.: PCT/JP2017/026661
§ 371 (c)(1),
(2) Date: Jan. 25, 2019

(87) PCT Pub. No.: WO2018/021231
PCT Pub. Date: Feb. 1, 2018

(65) Prior Publication Data
US 2020/0116156 A1    Apr. 16, 2020

(30) Foreign Application Priority Data

Jul. 27, 2016    (JP) .............................. JP2016-147523

(51) Int. Cl.
*F04D 13/06*    (2006.01)
*F04D 27/00*    (2006.01)
(Continued)

(52) U.S. Cl.
CPC ........... *F04D 27/001* (2013.01); *F04D 13/06* (2013.01); *F04D 29/043* (2013.01); *F04D 29/406* (2013.01)

(58) Field of Classification Search
CPC ............. F04D 13/0693; F04D 25/0693; F04D 27/001; F04D 13/06; F04D 29/043;
(Continued)

(56) References Cited

U.S. PATENT DOCUMENTS 6,389,903 B1 * 5/2002 Oba .................... G01L 19/0084
439/628
2003/0184982 A1 * 10/2003 Chikuan ............... G01L 19/142
361/752

(Continued)

FOREIGN PATENT DOCUMENTS

JP    2004-245599 A    9/2004

*Primary Examiner* — Peter J Bertheaud
*Assistant Examiner* — Dnyanesh G Kasture
(74) *Attorney, Agent, or Firm* — Keating & Bennett

(57) ABSTRACT

A pressure sensor device includes a pressure sensor, a sensor case, first and second terminals protruding from the pressure sensor in a first direction, a third terminal protruding from the pressure sensor in a second direction, a fourth terminal protruding from the pressure sensor in the second direction, a first capacitor on one side of the pressure sensor, a second capacitor on the other side of the pressure sensor, a first lead line extending out of the sensor case from the first terminal, a second lead line extending out of the sensor case from the second terminal, and a third lead line extending out of the sensor case from a side edge between the first terminal and the second terminal.

12 Claims, 7 Drawing Sheets

(51) Int. Cl.
*F04D 29/043* (2006.01)
*F04D 29/40* (2006.01)

(58) Field of Classification Search
CPC ............... F04D 29/406; F04D 25/0666; F04C 2270/18; F04C 2240/81; F04C 2240/803; F04C 2240/808; F04B 53/00; G01L 19/14
See application file for complete search history.

(56) References Cited

U.S. PATENT DOCUMENTS

| | | | | |
|---|---|---|---|---|
| 2007/0247322 | A1* | 10/2007 | Shinjo | G01L 19/0084 340/626 |
| 2008/0054384 | A1* | 3/2008 | Uematsu | H01R 13/405 257/415 |
| 2017/0321794 | A1* | 11/2017 | Kiehlneker | F16H 57/0434 |

* cited by examiner

PRESSURE SENSOR DEVICE AND ELECTRIC PUMP

BACKGROUND OF THE INVENTION

1. Field of the Invention

The present disclosure relates to a pressure sensor device and an electric pump.

2. Description of the Related Art

A pressure sensor configured to measure the pressure of fluid has been known. For example, a pressure sensor attached to a fluid pipe is known.

When the pressure of fluid such as oil pressurized by an electric pump is measured by a pressure sensor, the pressure sensor can be disposed in the electric pump. However, when a related art pressure sensor is simply disposed in the electric pump, the size of the electric pump is increased.

SUMMARY OF THE INVENTION

Example embodiments of the present disclosure provide pressure sensor devices for an electric pump, and electric pumps including such pressure sensor devices, with the pressure sensor devices each including an electric pump of reduced size.

A pressure sensor device according to an aspect of the present disclosure is a pressure sensor device for an electric pump. The pressure sensor device includes: a pressure sensor to measure a pressure of fluid inside the electric pump; a sensor case housing the pressure sensor; a first terminal and a second terminal protruding from the pressure sensor in a first direction extending toward one side in a horizontal direction; a third terminal protruding from the pressure sensor in a second direction extending toward the other side in the horizontal direction; a fourth terminal protruding from the pressure sensor in the second direction and electrically connected with the second terminal; a first capacitor disposed on the one side of the pressure sensor in the horizontal direction and connecting the first terminal and the second terminal; a second capacitor disposed on the other side of the pressure sensor in the horizontal direction and connecting the third terminal and the fourth terminal; a first lead line electrically connected with the first terminal and extending out of the sensor case from the first terminal toward the one side in the horizontal direction; a second lead line electrically connected with the second terminal and extending out of the sensor case from the second terminal toward the one side in the horizontal direction; and a third lead line electrically connected with the third terminal and extending out of the sensor case from a side edge between the first terminal and the second terminal toward the one side in the horizontal direction.

An electric pump according to another aspect of the present disclosure includes: a shaft to rotate about a central axis extending in the vertical direction; a motor to rotate the shaft; and a pump positioned on one side of the motor in the vertical direction to be driven through the shaft rotated by the motor, and further includes the above-described pressure sensor device. The first terminal and the second terminal are disposed on one side of the pressure sensor in a circumferential direction, the third terminal and the fourth terminal are disposed on the other side of the pressure sensor in the circumferential direction, and the pressure sensor device is disposed in the electric pump.

Example embodiments of the present disclosure provide pressure sensor devices for an electric pump, and electric pumps including the pressure sensor devices, the pressure sensor devices each including a reduced-size electric pump.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
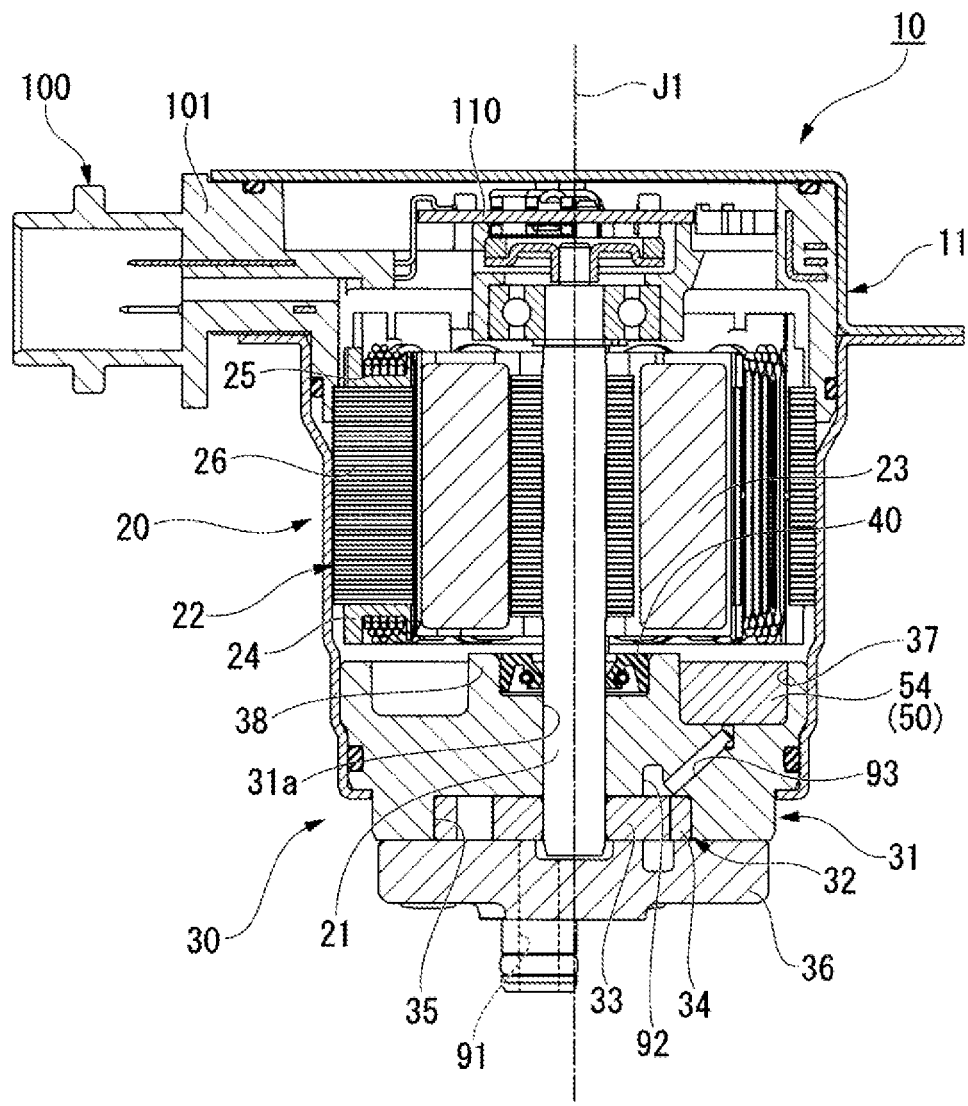
FIG. 1 is a cross-sectional view illustrating an electric pump according to an example embodiment of the present disclosure.

An electric pump 10 according to the present embodiment is an electric oil pump configured to pressurize oil as fluid and transfer the oil. As illustrated in FIG. 1, the electric pump 10 includes a case 11 housing and holding each component of the electric pump 10, a shaft 21 configured to rotate about a central axis J1, a motor unit 20 configured to rotate the shaft 21, a pump unit 30 configured to be driven through the shaft 21 by the motor unit 20, a bus bar unit 100, a circuit board 110, and a pressure sensor device 50.

The central axis J1 extends in the vertical direction. In the following description, unless otherwise stated, a direction parallel to the axial direction of the central axis J1 is simply referred to as a "vertical direction", a radial direction with respect to the central axis J1 is simply referred to as a "radial direction", and a circumferential direction with respect to the central axis J1 is simply referred to as a "circumferential direction". In addition, unless otherwise stated, the upper side the vertical direction in FIG. 1 is simply referred to as an "upper side", and the lower side in the vertical direction in FIG. 1 is simply referred to as a "lower side". The vertical direction, the upper side, and the lower side are names merely used for description, and do not limit actual positional relations and directions.

The motor unit 20 includes a rotor 23 and a stator 22. The rotor 23 is fixed to the outer peripheral surface of the shaft 21. The stator 22 is disposed on the outer side of the rotor 23 in the radial direction and surrounds the rotor 23. The stator 22 includes a stator core 26, an insulator 24 mounted on the stator core 26, and a plurality of coils 25 mounted on the stator core 26 through the insulator 24.

The pump unit 30 is positioned on one side of the motor unit 20 in the vertical direction. In FIG. 1, the pump unit 30 is positioned below the motor unit 20. The pump unit 30 includes a pump body 31, a pump gear 32, and a pump cover 36. The pump body 31 is disposed below the motor unit 20 and faces to the motor unit 20 through a gap in the axial direction. The pump body 31 includes a pump chamber 35 recessed from a surface on the lower side (one side in the vertical direction) toward the upper side (the other side in the vertical direction) and housing the pump gear 32. Although not illustrated, the pump chamber 35 has a circular shape when viewed in the vertical direction. The pump body 31 includes a through-hole 31a having openings at both ends in the vertical direction through which the shaft 21 penetrates, the opening on the lower side (the one side in the vertical direction) being opened to the pump chamber 35.

Figure 2:
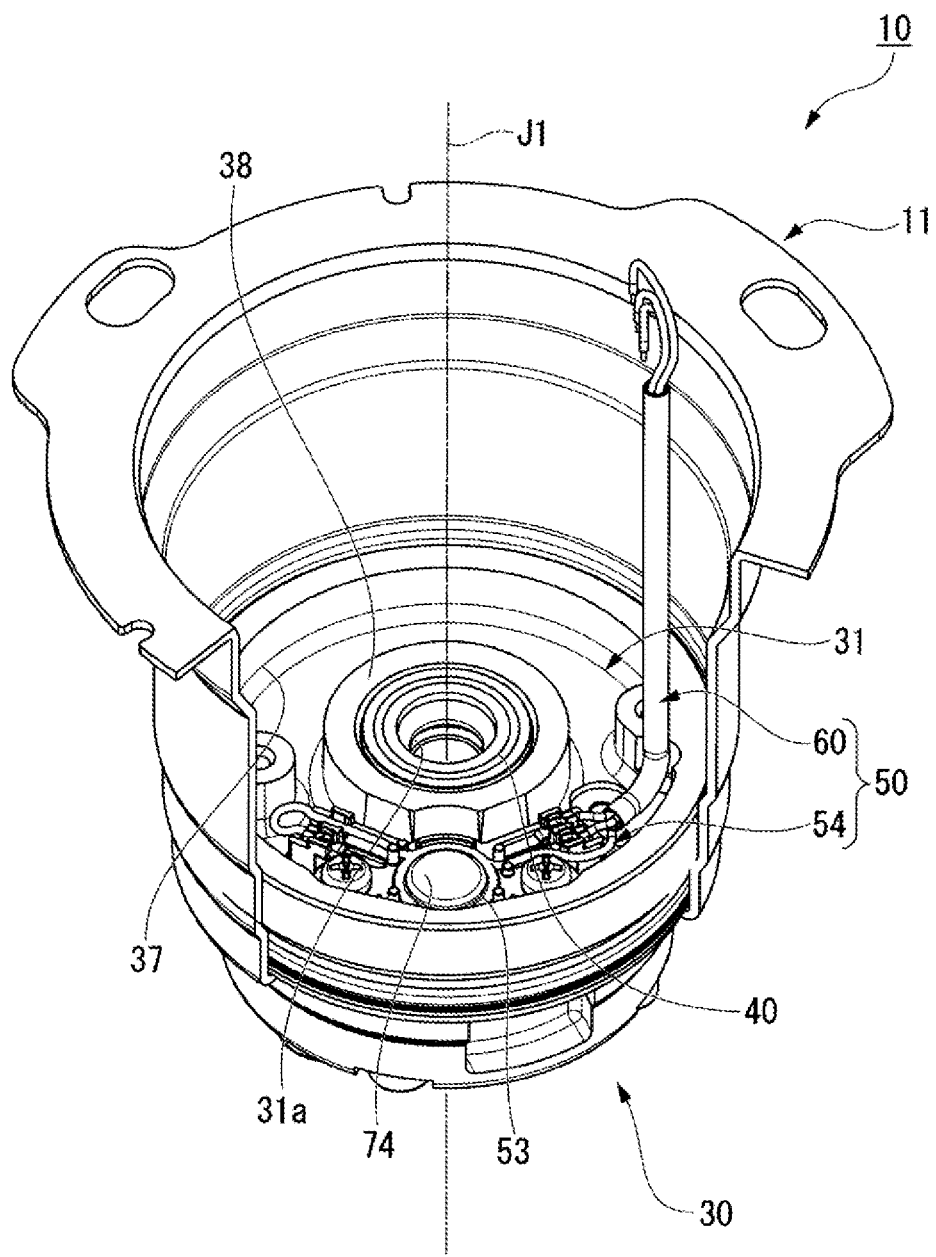
FIG. 2 is a partially sectional perspective view illustrating a portion of a case, a pump unit, and a pressure sensor device according to an example embodiment of the present disclosure.

The pump body 31 includes a sensor housing recess 37 recessed from a surface on the upper side (the other side in the vertical direction) toward the lower side (the one side in the vertical direction). The sensor housing recess 37 is disposed on the outer side of the through-hole 31a in the radial direction. As illustrated in FIG. 2, the sensor housing recess 37 has a circular ring shape having a center through which the central axis J1 passes. The pump body 31 includes a seal holding unit 38 protruding upward. The seal holding unit 38 has a cylindrical shape having a center at the central axis J1 and opened upward.

The seal holding unit 38 is disposed on the inner side of the sensor housing recess 37 in the radial direction. As illustrated in FIG. 1, an oil seal 40 is held inside the seal holding unit 38. The inside of the seal holding unit 38 is communicated with the through-hole 31a. The shaft 21 penetrates through the inside of the seal holding unit 38.

The pump gear 32 rotates along with rotation of the shaft 21. In the present embodiment, the pump gear 32 is attached to a lower end part of the shaft 21. The pump gear 32 includes an inner rotor 33 fixed to an outer peripheral surface at the lower end part of the shaft 21, and an outer rotor 34 surrounding the outside of the inner rotor 33 in the radial direction. The inner rotor 33 and the shaft 21 may be allowed to relatively rotate about a central axis J1 to some extent. The pump cover 36 is attached below the pump body 31. The pump cover 36 has a lid shape spreading in the radial direction. The pump cover 36 blocks the opening below the pump chamber 35.

The pump unit 30 includes an introduction oil path 91, a discharging oil path 92, and a detection oil path 93. In FIG. 1, the introduction oil path 91 is provided to the pump cover 36. The introduction oil path 91 is an oil path connected with the pump chamber 35 to take oil into the pump chamber 35. In FIG. 1, the discharging oil path 92 is provided to the pump body 31. The discharging oil path 92 is an oil path connected with the pump chamber 35 to discharge oil from the pump chamber 35. The detection oil path 93 is an oil path provided to the pump body 31 and connecting the discharging oil path 92 and the sensor housing recess 37. In FIG. 1, the detection oil path 93 extends obliquely upward from the discharging oil path 92 toward the outer side in the radial direction.

The bus bar unit 100 is disposed above the motor unit 20. The bus bar unit 100 includes a bus bar electrically connected with the stator 22, a bus bar electrically connected with the circuit board 110, and a tubular bus bar holder 101 holding each bus bar. The circuit board 110 is held by the bus bar holder 101 on the inner side of the bus bar holder 101 in the radial direction. Although not illustrated, the circuit board 110 is electrically connected with the pressure sensor device 50.

Figure 3:
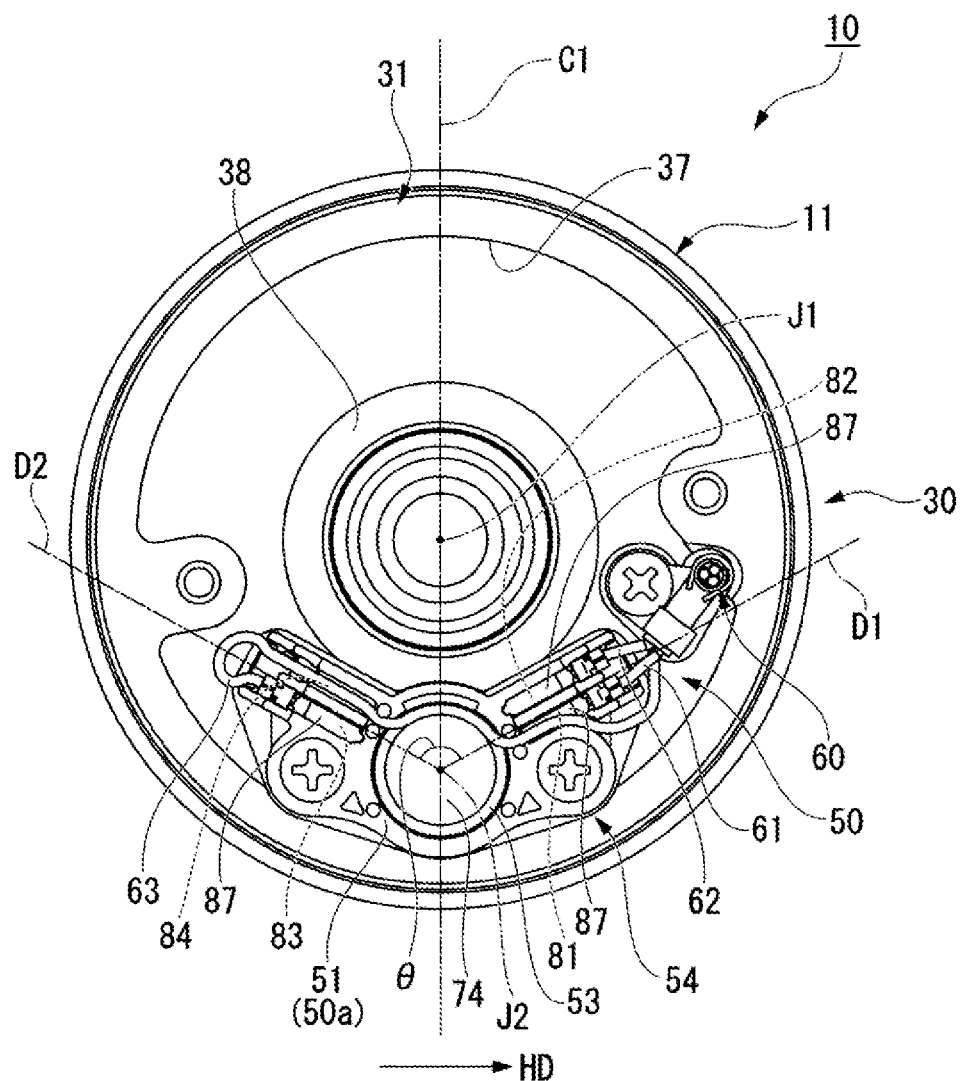
FIG. 3 is a plan view illustrating a portion of a case, a pump unit, and a pressure sensor device according to an example embodiment of the present disclosure.
Figure 4:
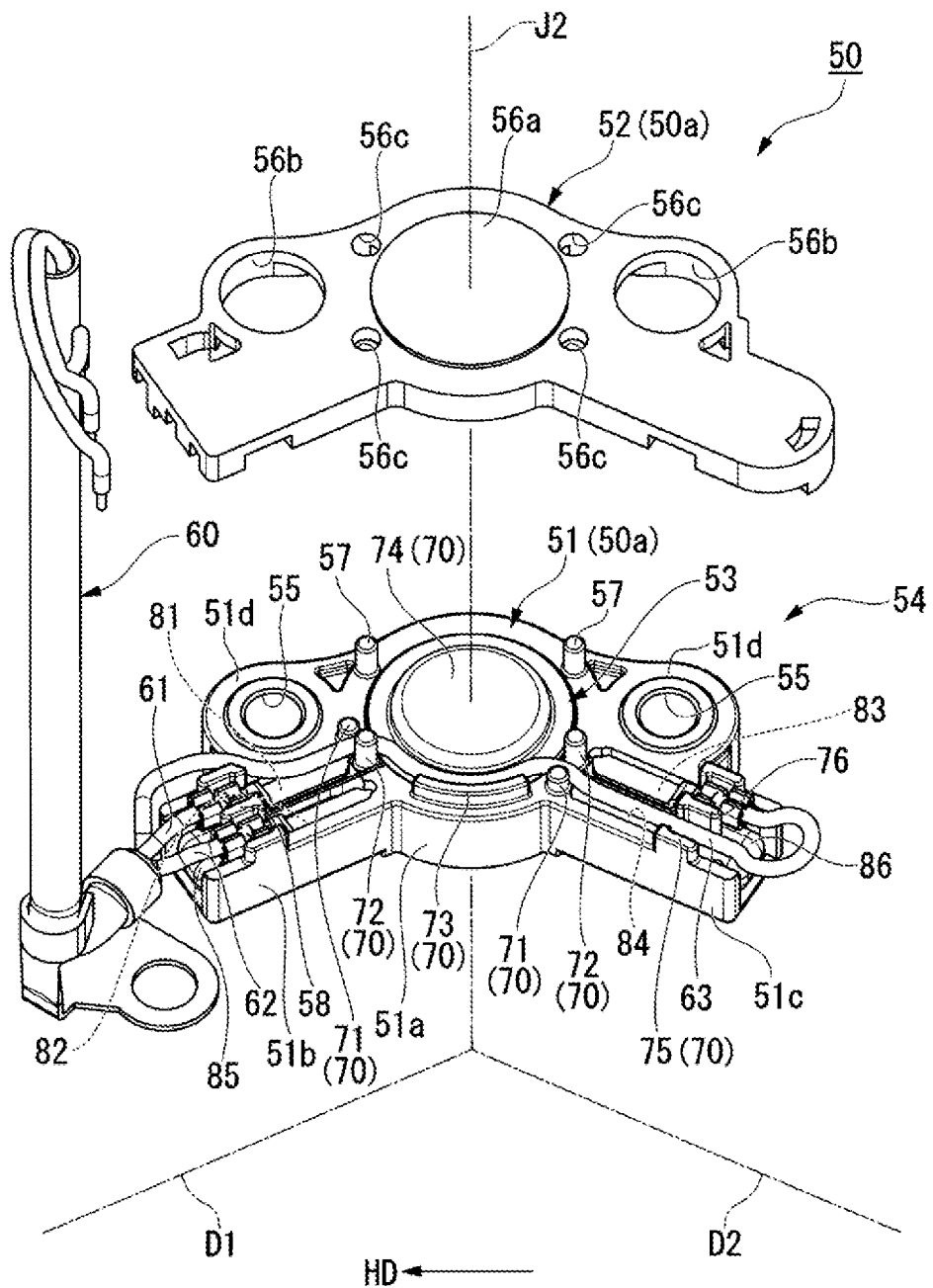
FIG. 4 is an exploded perspective view illustrating a pressure sensor device according to an example embodiment of the present disclosure.
Figure 5:
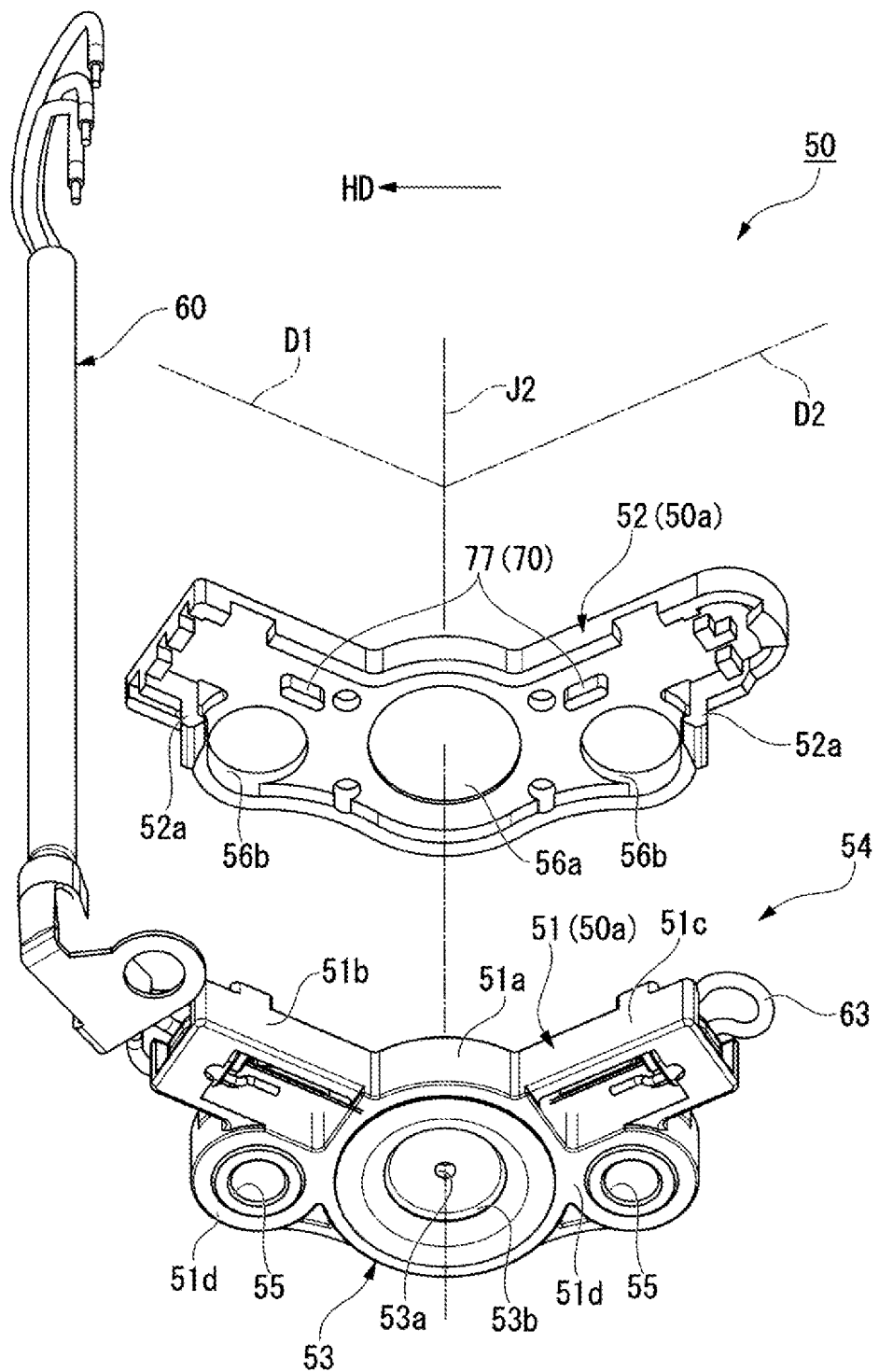
FIG. 5 is an exploded perspective view illustrating a pressure sensor device according to an example embodiment of the present disclosure.

The pressure sensor device 50 is a pressure sensor device for the electric pump 10 and disposed in the electric pump 10. As illustrated in FIGS. 1 and 2, the pressure sensor device 50 is fixed in the sensor housing recess 37. As illustrated in FIGS. 3 to 5, the pressure sensor device 50 includes a pressure sensor device body 54 housed in the sensor housing recess 37, and an electrical connection cable 60 extending upward from the pressure sensor device body 54 and connected with the circuit board 110.

The electrical connection cable 60 is a cable formed as a bundle of a first lead line 61, a second lead line 62, and a third lead line 63. In other words, the pressure sensor device 50 includes the first lead line 61, the second lead line 62, and the third lead line 63. Each lead line is any one of a power lead line for supplying power to the pressure sensor device body 54, a ground lead line for grounding the pressure sensor device body 54, and an output lead line outputting, as an electric signal, a pressure value measured by the pressure sensor device body 54. In the present embodiment, as an example, the first lead line 61 is a power lead line, the second lead line 62 is a ground lead line, and the third lead line 63 is an output lead line.

Figure 6:
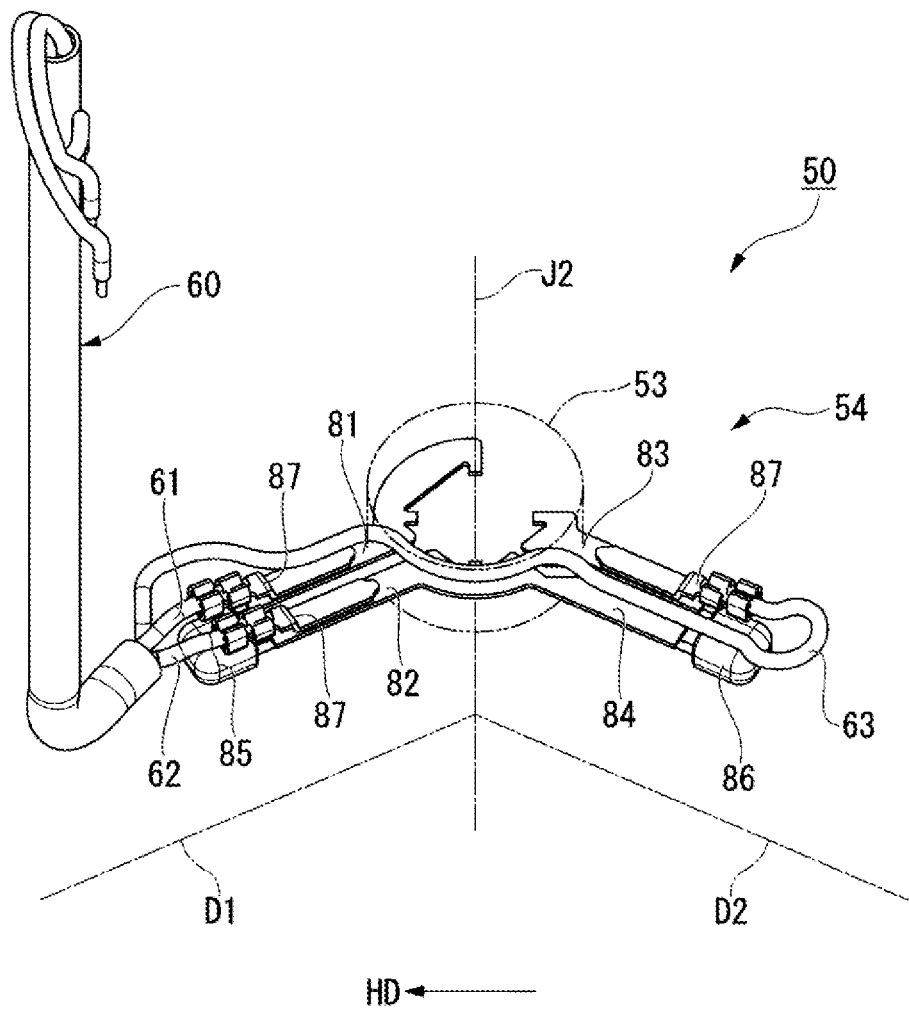
FIG. 6 is a perspective view illustrating a portion of a pressure sensor device according to an example embodiment of the present disclosure.

The pressure sensor device body 54 has a flat shape having a dimension relatively small in the vertical direction. As illustrated in FIG. 4, the pressure sensor device body 54 includes a pressure sensor 53 and a sensor case 50a. As illustrated in FIG. 6, the pressure sensor device body 54 includes a first terminal 81, a second terminal 82, a third terminal 83, a fourth terminal 84, a first capacitor 85, and a second capacitor 86. In other words, the pressure sensor device 50 includes the pressure sensor 53, the first terminal 81, and the second terminal 82, the third terminal 83, the fourth terminal 84, the first capacitor 85, the second capacitor 86, and the sensor case 50a. In FIG. 6, illustration of the sensor case 50a is omitted, and the pressure sensor 53 is illustrated with a dashed and double-dotted line.

As illustrated in FIG. 4, the sensor case 50a houses the pressure sensor 53, the first terminal 81, the second terminal 82, the third terminal 83, the fourth terminal 84, the first capacitor 85, and the second capacitor 86.

The pressure sensor 53 measures the pressure of fluid inside the electric pump 10, in other words, oil in the present embodiment. The pressure sensor 53 has a flat cylindrical shape having a center through which a sensor central axis J2 passes. The sensor central axis J2 is parallel to the central axis J1 and extends in the vertical direction. As illustrated in FIG. 3, the sensor central axis J2 is disposed separately from the central axis J1 in the radial direction. The sensor central axis J2 is positioned at the center of the sensor housing recess 37 in the radial direction. As illustrated in FIG. 5, the pressure sensor 53 includes a lower recess 53b recessed upward from a lower surface, and a detection hole 53a provided at the center of the bottom surface of the lower recess 53b. When viewed from below, the lower recess 53b and the detection hole 53a each have a circular shape having a center through which the sensor central axis J2 passes.

As illustrated in FIG. 6, the first terminal 81 to the fourth terminal 84 each have a flat plate shape orthogonal to the vertical direction. In each of the first terminal 81 to the fourth terminal 84, an inner end part in the radial direction with respect to the sensor central axis J2 is embedded and fixed inside the pressure sensor 53. The fourth terminal 84 is electrically connected with the second terminal 82. In the present embodiment, the second terminal 82 and the fourth terminal 84 are formed as a single component. The first terminal 81, the second terminal 82 and the fourth terminal 84, and the third terminal 83 are separated and insulated from each other.

The first terminal 81 and the second terminal 82 each protrude from the pressure sensor 53 in a first direction D1 extending toward one side in the horizontal direction. The third terminal 83 and the fourth terminal 84 each protrudes in a second direction D2 extending toward the other side in the horizontal direction. The first terminal 81 and the second terminal 82 are disposed side by side in a direction orthogonal to the first direction D1 and the vertical direction. The third terminal 83 and the fourth terminal 84 are disposed side by side in a direction orthogonal to the second direction D2 and the vertical direction. The first terminal 81 to the fourth terminal 84 each have a plate surface parallel to a horizontal plane orthogonal to the vertical direction, and are disposed on an identical horizontal plane orthogonal to the vertical direction.

In the present embodiment, the horizontal direction is, for example, a horizontal direction HD orthogonal to a virtual line C1 connecting the central axis J1 and the sensor central axis J2 in plan view illustrated in FIG. 3, in other words, the right and left direction in FIG. 3. In the present embodiment, the one side in the horizontal direction is the positive side (+HD side) in the horizontal direction HD, in other words, the right side in FIG. 3, and the other side in the horizontal direction is the negative side (−HD side) in the horizontal direction HD, in other words, the left side in FIG. 3.

In the present embodiment, the first direction D1 extending toward the one side in the horizontal direction is one of a plurality of horizontal directions orthogonal to the vertical direction, and is one of directions extending from the sensor central axis J2 at the center of the pressure sensor 53 toward a region on the right side (+HD side) of the virtual line C1. In FIG. 3, the first direction D1 extends from the sensor central axis J2 toward the right side at a tilt to the central axis J1 side (the upper side in FIG. 3) relative to the horizontal direction orthogonal to the virtual line C1. The first direction D1 is one of radial directions with respect to the sensor central axis J2.

In the present embodiment, the second direction D2 extending toward the other side in the horizontal direction is one of a plurality of horizontal directions orthogonal to the vertical direction, and is one of directions extending from the sensor central axis J2 at the center of the pressure sensor 53 toward a region on the left side (−HD side) of the virtual line C1. In FIG. 3, the second direction D2 extends from the sensor central axis J2 toward the left side at a tilt to the central axis J1 side (the upper side in FIG. 3) relative to the horizontal direction orthogonal to the virtual line C1. The second direction D2 is one of radial directions with respect to the sensor central axis J2. An angle θ between the first direction D1 and the second direction D2 is an obtuse angle.

The first terminal 81 and the second terminal 82 are disposed on one side of the pressure sensor 53 the circumferential direction. The third terminal 83 and the fourth terminal 84 are disposed on the other side of the pressure sensor 53 in the circumferential direction. In the present embodiment, the one side of the pressure sensor 53 in the circumferential direction is a side proceeding anticlockwise about the central axis J1 from the pressure sensor 53 when viewed from above. The other side of the pressure sensor 53 in the circumferential direction is a side proceeding clockwise about the central axis J1 from the pressure sensor 53 when viewed from above.

As illustrated in FIG. 6, the first capacitor 85 is disposed on the one side (+HD side) of the pressure sensor 53 in the horizontal direction, and connects the first terminal 81 and the second terminal 82. The first capacitor 85 is disposed on extended lines of the first terminal 81 and the second terminal 82 in the first direction D1. The second capacitor 86 is disposed on the other side (−HD side) of the pressure sensor 53 in the horizontal direction, and connects the third terminal 83 and the fourth terminal 84. The second capacitor 86 is disposed on extended lines of the third terminal 83 and the fourth terminal 84 in the second direction D2. The first capacitor 85 and the second capacitor 86 can reduce generation of surge current.

The first lead line 61 is electrically connected with the first terminal 81. More specifically, the first lead line 61 is fixed to a connection clasp 87 fixed to the upper surface of the first terminal 81, and is electrically connected with the first terminal 81 through the connection clasp 87. The second lead line 62 is electrically connected with the second terminal 82. More specifically, the second lead line 62 is fixed to another connection clasp 87 fixed to the upper surface of the second terminal 82, and is electrically connected with the second terminal 82 through the connection clasp 87. The third lead line 63 is electrically connected with the third terminal 83. More specifically, the third lead line 63 is fixed to another connection clasp 87 fixed to the upper surface of the third terminal 83, and is electrically connected with the third terminal 83 through the connection clasp 87.

As described above, according to the present embodiment, each terminal connected with the corresponding lead line extends from the pressure sensor 53 in the first direction D1 or the second direction D2 as one of horizontal directions. Thus, the size of the pressure sensor device body 54 (pressure sensor device 50) can be reduced in the vertical direction. Each two of the four terminals protrude from the pressure sensor 53 in the first direction D1 or the second direction D2 extending in the other horizontal direction. Thus, the size of the pressure sensor device body 54 can be reduced in the vertical direction and the radial direction as compared to a configuration in which the four terminals are disposed protruding in the same direction. Since each two of the four terminals protrude in the first direction D1 or the second direction D2, the first capacitor 85 and the second capacitor 86 can be disposed on opposite sides in a horizontal direction with respect to the pressure sensor 53. Accordingly, the size of the pressure sensor device body 54 can be reduced in the vertical direction and the radial direction as compared to a configuration in which the first capacitor 85 and the second capacitor 86 are disposed on the same side of the pressure sensor 53. Thus, according to the present embodiment, the pressure sensor device body 54 can have a size reduced in both of the vertical direction and the radial direction to have an elongated flat shape as a whole. Thus, it is possible to reduce increase in the size of the electric pump 10 when the pressure sensor device body 54 is disposed in the electric pump 10 by disposing the pressure sensor device body 54 along the circumferential direction with respect to the central axis J1 in the electric pump 10.

Specifically, as in the present embodiment, the pressure sensor device body 54 can be disposed along the circumferential direction when the first terminal 81 and the second terminal 82 are disposed on the one side of the pressure sensor 53 in the circumferential direction, and the third terminal 83 and the fourth terminal 84 are disposed on the other side of the pressure sensor 53 in the circumferential direction. Accordingly, the pressure sensor device 50 can be disposed in the electric pump 10 with reduced increase in the size of the electric pump 10. In particular, when the angle θ between the first direction D1 and the second direction D2 is an obtuse angle as in the present embodiment, the entire shape of the pressure sensor device body 54 is likely to be a shape along the circumferential direction, which facilitates disposition of the pressure sensor device body 54 in the sensor housing recess 37 extending in the circumferential direction. Accordingly, increase in the size of the electric pump 10 can be further reduced.

As illustrated in FIGS. 4 and 6, the first lead line 61 is extending out of the sensor case 50a from the first terminal 81 toward the one side (+HD side) in the horizontal direction. The second lead line 62 is extending out of the sensor case 50a from the second terminal 82 toward the one side in the horizontal direction. The third lead line 63 is extending out of the sensor case 50a from a side edge between the first terminal 81 and the second terminal 82 toward the one side in the horizontal direction.

In the configuration in which each two of the terminals protrude in the first direction D1 or the second direction D2, the lead lines connected with the respective terminals are disposed separately on both opposite sides of the pressure sensor 53 in the horizontal direction HD. This leads to increase in the number of components for fixing the lead lines, and thus to increase in work and cost of assembling the pressure sensor device 50 in the electric pump 10 in some cases. However, according to the present embodiment, all lead lines are collectively extending out of the sensor case 50a from the same side in the horizontal direction HD. This leads to decrease in the number of components for fixing the three lead lines of the power lead line, the ground lead line, and the output lead line, and thus to reduction in work and cost of assembling the pressure sensor device 50 in the electric pump 10. Accordingly, when the pressure sensor device body 54 is formed in an elongated flat shape, it is possible to reduce increase in the size of the electric pump 10 and improve convenience in assembling the electric pump 10.

As illustrated in FIGS. 4 and 5, the sensor case 50a includes a case body 51 and a cover 52. The case body 51 is a part that is opened in the vertical direction orthogonal to the horizontal direction and in which the pressure sensor 53 is housed. In the present embodiment, the case body 51 is opened upward. The case body 51 includes a sensor housing unit 51a, terminal housing units 51b and 51c, and a pair of fixation parts 51d.

The sensor housing unit 51a has a cylindrical shape around the sensor central axis J2. The sensor housing unit 51a holds the pressure sensor 53 inside. The sensor housing unit 51a includes a cylindrical positioning convex portion 57 protruding upward from an upper surface. Two of the positioning convex portions 57 are provided. A terminal housing unit 51b has a rectangular box shape opened upward and protruding from the sensor housing unit 51a in the first direction D1. The terminal housing unit 51b holds the first terminal 81, the second terminal 82, and the first capacitor 85 inside. A terminal housing unit 51c has a rectangular box shape opened upward and protruding from the sensor housing unit 51a in the second direction D2. The terminal housing unit 51c holds the third terminal 83, the fourth terminal 84, and the second capacitor 86 inside.

The pair of fixation parts 51d protrude from the sensor housing unit 51a toward both sides in the horizontal direction HD. The pair of fixation parts 51d is each provided with a fixation hole 55 having a circular shape penetrating through the fixation part 51d in the vertical direction. The fixation hole 55 is, for example, the inner side of a cylindrical component embedded in the fixation part 51d.

The cover 52 is a part fixed to the case body 51 to cover the opening of the case body 51. In the present embodiment, the cover 52 is attached above the case body 51. As illustrated in FIG. 5, the cover 52 includes a pair of attachment parts 52a protruding downward from both sides in the horizontal direction HD. The pair of attachment parts 52a are hooked to the case body 51. In this manner, the cover 52 is fixed to the case body 51. FIGS. 2 and 3 omit illustration of the cover 52.

As illustrated in FIG. 4, the cover 52 includes a cover convex portion 56a protruding upward, and a cover through-hole 56b and a positioning hole 56c penetrating through the cover 52 in the vertical direction. In plan view, the cover convex portion 56a has a circular shape having a center through which the sensor central axis J2 passes. The cover convex portion 56a overlaps the pressure sensor 53 in plan view. Each cover through-hole 56b overlaps the corresponding fixation hole 55 in plan view. Four of the positioning holes 56c are provided around the cover convex portion 56a. The two positioning convex portions 57 are inserted in two of the positioning holes 56c.

Figure 7:
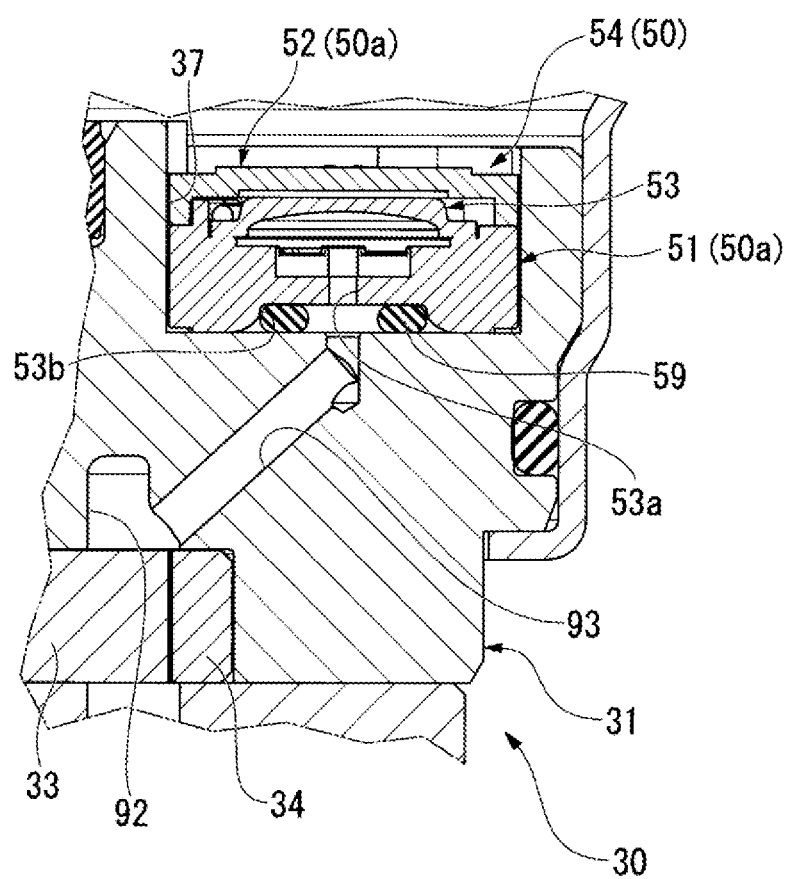
FIG. 7 is a cross-sectional view illustrating a pressure sensor device according to an example embodiment of the present disclosure, and a partially enlarged diagram FIG. 1.

As illustrated in FIGS. 2 and 3, the pressure sensor device body 54 is fixed to the pump body 31 when a screw inserted into each fixation hole 55 from above through the corresponding cover through-hole 56b is fastened to a screw hole provided to the bottom surface of the sensor housing recess 37 in the pump body 31. The inner end of the sensor housing unit 51a in the radial direction contacts the outer peripheral surface of the seal holding unit 38, and the outer end of the sensor housing unit 51a in the radial direction contacts the outer side surface of the sensor housing recess 37 in the radial direction. As illustrated in FIG. 7, the lower surface of the pressure sensor device body 54 contacts the bottom surface of the sensor housing recess 37. In a state in which the pressure sensor device body 54 is fixed to the pump body 31, an O ring 59 is disposed on the inner side of the lower recess 53b. The O ring 59 has a circular ring shape along the inner rim of the lower recess 53b. The O ring 59 contacts the bottom surface of the sensor housing recess 37 and the top surface of the lower recess 53b, and seals a gap between the pressure sensor device body 54 and the pump body 31. The detection oil path 93 has an upper end opened inside the lower recess 53b.

In a state in which the pressure sensor device 50 is fixed to the pump body 31, oil having flowed into the sensor housing recess 37 through the detection oil path 93 flows into the detection hole 53a. More specifically, oil having flowed into the lower recess 53b through the detection oil path 93 flows into the detection hole 53a. Accordingly, the pressure of oil pressurized by the electric pump 10 can be measured by the pressure sensor 53. In the present embodiment, since the O ring 59 sealing the gap between the pressure sensor device body 54 and the pump body 31 is disposed in the lower recess 53b, the oil having flowed into the lower recess 53b can be prevented from leaking out of the sensor housing recess 37.

As illustrated in FIG. 4, the pressure sensor device 50 includes a plurality of routing parts 70. The routing parts 70 guide the third lead line 63 from the other side (−HD side) of the pressure sensor 53 in the horizontal direction to the one side (+HD side) of the pressure sensor 53 in the horizontal direction. In the present embodiment, the routing parts 70 are disposed inside the sensor case 50a. The third lead line 63 is guided to the one side of the pressure sensor 53 in the horizontal direction through the inside of the sensor case 50a by the routing parts 70. Thus, the third lead line 63 can be easily guided to the one side in the horizontal direction while being fixed to the sensor case 50a, and can be protected by the sensor case 50a.

The routing parts 70 includes a plurality of protrusion parts protruding in the vertical direction orthogonal to the horizontal direction. Thus, the third lead line 63 can be routed by hooking the third lead line 63 to the plurality of protrusion parts. The plurality of protrusion parts include a pair of protrusion parts 71 and 72, protrusion parts 73 and 75 to 77, and a sensor protrusion part 74.

The pair of protrusion parts 71 and 72 have cylindrical shapes protruding upward from the upper surface of the sensor housing unit 51a. The protrusion parts 71 and 72 are disposed side by side in the circumferential direction with respect to the sensor central axis J2. The pair of protrusion parts 71 and 72 sandwich the third lead line 63. Thus, the third lead line 63 can be held by the pair of protrusion parts 71 and 72, and thus solidly fixed to the sensor case 50a. The pair of protrusion parts 71 and 72 are provided on each side in the horizontal direction HD. One of the pair of protrusion parts 71 and 72 is provided to protrude from the upper surface of a part connected with the terminal housing unit 51b in the sensor housing unit 51a, and the other of the pair of protrusion parts 71 and 72 is provided to protrude from the upper surface of a part connected with the terminal housing unit 51c in the sensor housing unit 51a.

The protrusion part 72 has a protrusion height higher than that of the protrusion part 71, and functions as a positioning convex portion to be inserted into the corresponding positioning hole 56c. The two protrusion parts 72 are inserted in the two positioning holes 56c, respectively. Accordingly, the cover 52 is positioned relative to the case body 51 when the two positioning convex portions 57 and the two protrusion parts 72 functioning as positioning convex portions are inserted into the positioning holes 56c.

The protrusion part 73 protrudes upward from the upper surface of the sensor housing unit 51a. The protrusion part 73 extends in the circumferential direction with respect to the sensor central axis J2. The protrusion part 73 is positioned at the inner end of the sensor housing unit 51a in the radial direction with respect to the central axis J1. The sensor protrusion part 74 is an upward protruding central part of the pressure sensor 53. Accordingly, the sensor protrusion part 74 is provided to the pressure sensor 53. Thus, the third lead line 63 can be routed by using the pressure sensor 53. In addition, the third lead line 63 can be routed closely to the pressure sensor 53, which further facilitates downsizing of the entire pressure sensor device 50.

The sensor protrusion part 74 has a circular flat shape in plan view. The protrusion part 73 and the sensor protrusion part 74 sandwich the third lead line 63 so that part of the third lead line 63 sandwiched between the protrusion part 73 and the sensor protrusion part 74 is routed along the circumferential direction with respect to the sensor central axis J2.

The protrusion part 75 protrudes upward from an edge of the terminal housing unit 51c on the inner side (in FIG. 4, the front side) in the radial direction with respect to the central axis J1. The protrusion part 75 has a wall shape extending in the second direction D2. The protrusion part 76 protrudes upward from a lower wall part of the terminal housing unit 51c. The protrusion part 76 is disposed between the third terminal 83 and the fourth terminal 84. The protrusion part 76 has a wall shape extending in the second direction D2. The protrusion part 76 separates the third terminal 83 and the fourth terminal 84 from each other to prevent contact between the third terminal 83 and the fourth terminal 84. Accordingly, the third lead line 63 can be routed while the third terminal 83 and the fourth terminal 84 are insulated from each other by the protrusion part 76. The protrusion part 75 and the protrusion part 76 sandwich the third lead line 63.

The terminal housing unit 51b is provided with a protrusion part 58 separately from the protrusion parts of the routing parts 70. The protrusion part 58 protrudes upward from a lower wall part of the terminal housing unit 51b. The protrusion part 58 is disposed between the first terminal 81 and the second terminal 82. The protrusion part 58 has a wall shape extending in the first direction D1. The protrusion part 58 separates the first terminal 81 and the second terminal 82 from each other to prevent contact between the first terminal 81 and the second terminal 82.

As illustrated in FIG. 5, the protrusion part 77 protrudes downward from the lower surface of the cover 52. The protrusion parts 77 are provided on both sides, respectively, in the horizontal direction HD and extend in the first direction D1 and the second direction D2, respectively. In this manner, the routing parts 70 are provided to both of the case body 51 and the cover 52, which facilitates routing of the third lead line 63 and more stably holding of the third lead line 63 in the sensor case 50a.

The third lead line 63 is partially extending out of the sensor case 50a from the third terminal 83, and then bent and housed inside the sensor case 50a again. Then, the third lead line 63 sequentially passes through a space between the protrusion part 75 and the protrusion part 76, a space between the pair of protrusion parts 71 and 72 on the other side (−HD side) in the horizontal direction, a space between the protrusion part 73 and the sensor protrusion part 74, and a space between the pair of protrusion parts 71 and 72 on the one side (+HD side) in the horizontal direction, and is extending out of the sensor case 50a from the side edge between the first terminal 81 and the second terminal 82 toward the one side in the horizontal direction. The third lead line 63 is held inside the sensor case 50a while being hooked to each protrusion part.

A part of the third lead line 63 passing from the space between the protrusion part 75 and the protrusion part 76 to the space between the pair of protrusion parts 71 and 72 on the other side in the horizontal direction extends in the second direction D2 above the fourth terminal 84. In other words, the third lead line 63 is guided to the one side of the pressure sensor 53 in the horizontal direction through a place overlapping the fourth terminal 84 in the vertical direction orthogonal to the horizontal direction. Thus, a space in the sensor case 50a can be efficiently used as a space in which the third lead line 63 is routed, which results in further downsizing of the pressure sensor device 50.

The routing parts 70 are not particularly limited but only need to guide the third lead line 63 to the one side of the pressure sensor 53 in the horizontal direction. The routing parts 70 may be grooves to which the third lead line 63 is fitted. The routing parts 70 may be provided only to the sensor case 50a, only to the case body 51, or only to the cover 52.

The third lead line 63 may be extending out of the sensor case 50a from the third terminal 83 toward the other side (−HD side) in the horizontal direction, and routed from the other side of the pressure sensor 53 in the horizontal direction to the one side (+HD side) of the pressure sensor 53 in the horizontal direction. In this case, a routing part for guiding the third lead line 63 to the one side of the pressure sensor 53 in the horizontal direction may be disposed outside of the sensor case 50a so that the third lead line 63 is guided to the one side of the pressure sensor 53 in the horizontal direction through the outside of the sensor case 50a by the routing part. The routing part provided outside of the sensor case 50a may be, for example, a protrusion part or groove provided on the upper surface of the cover 52. In such a case, too, the lead lines can be bundled on the same side in the horizontal direction HD, which leads to decrease in the number of components for fixing the three lead lines of the power lead line, the ground lead line, and the output lead line. This results in reduction of work and cost of assembling the pressure sensor device 50 in the electric pump 10.

The third lead line 63 may be a power lead line. In this case, the first lead line 61 may be an output lead line and the second lead line 62 may be a ground lead line, or the first lead line 61 may be a ground lead line and the second lead line 62 may be an output lead line.

The angle θ between the first direction D1 and the second direction D2 may be an acute angle, a right angle, or two right angles. The first direction D1 and the second direction D2 may be parallel to the horizontal direction HD.

The pressure sensor device according to the present disclosure is not limited to the electric pump 10 configured to pressurize and transfer oil in the above-described embodiment, but may be any electric pump configured to transfer fluid and is applicable to any electric pump.

The above-described configurations may be combined with each other as appropriate as long as mutual inconsistency therebetween is avoided.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A pressure sensor device for an electric pump, the pressure sensor device comprising:
    a pressure sensor to measure a pressure of fluid inside the electric pump;
    a sensor case housing the pressure sensor;
    a first terminal and a second terminal protruding from the pressure sensor in a first direction extending toward a first side in a horizontal direction;
    a third terminal protruding from the pressure sensor in a second direction extending toward a second side in the horizontal direction;
    a fourth terminal protruding from the pressure sensor in the second direction and electrically connected with the second terminal;
    a first capacitor disposed on the first side of the pressure sensor in the horizontal direction and connecting the first terminal and the second terminal;
    a second capacitor disposed on the second side of the pressure sensor in the horizontal direction and connecting the third terminal and the fourth terminal;
    a first lead line electrically connected with the first terminal and extending out of the sensor case from the first terminal toward the first side in the horizontal direction;
    a second lead line electrically connected with the second terminal and extending out of the sensor case from the second terminal toward the first side in the horizontal direction;
    a third lead line electrically connected with the third terminal and extending out of the sensor case from a side edge between the first terminal and the second terminal toward the first side in the horizontal direction; and
    a guide that guides the third lead line from the second side of the pressure sensor in the horizontal direction to the first side of the pressure sensor in the horizontal direction; wherein
    the guide is disposed inside the sensor case; and
    the third lead line is guided to the first side of the pressure sensor in the horizontal direction through an inside of the sensor case by the guide.

2. The pressure sensor device for an electric pump according to claim 1, wherein the third lead line is guided to the first side of the pressure sensor in the horizontal direction through an area overlapping the fourth terminal in the vertical direction orthogonal to the horizontal direction.

3. The pressure sensor device for an electric pump according to claim 1, wherein the sensor case includes:
    a case body opened in the vertical direction orthogonal to the horizontal direction and housing the pressure sensor; and
    a cover fixed to the case body and covering the opening of the case body; wherein
    the guide is provided to both of the case body and the cover.

4. The pressure sensor device for an electric pump according to claim 1, wherein an angle between the first direction and the second direction is an obtuse angle.

5. An electric pump comprising:
    a shaft to rotate about a central axis extending in a vertical direction;
    a motor to rotate the shaft;
    a pump on first side of the motor in the vertical direction to be driven through the shaft rotated by the motor; and
    the pressure sensor device for an electric pump according to claim 1; wherein
    the first terminal and the second terminal are disposed on a first side of the pressure sensor in a circumferential direction;
    the third terminal and the fourth terminal are disposed on a second side of the pressure sensor in the circumferential direction; and
    the pressure sensor device is disposed in the electric pump.

6. The electric pump according to claim 5, wherein the pump includes:
    a pump gear to rotate along with rotation of the shaft; and
    a pump body including a pump chamber recessed from a surface on the first side of the motor in the vertical direction toward a second side of the motor in the vertical direction and housing the pump gear; and
    a through-hole including openings at two ends in the vertical direction through which the shaft penetrates, the opening on the first side of the motor in the vertical direction being opened to the pump chamber;
    the pump body includes a sensor housing recess recessed from a surface on the second side in the vertical direction toward the first side of the motor in the vertical direction; and
    the pressure sensor device is fixed in the sensor housing recess.

7. A pressure sensor device for an electric pump, the pressure sensor device comprising:
- a pressure sensor to measure a pressure of fluid inside the electric pump;
- a sensor case housing the pressure sensor;
- a first terminal and a second terminal protruding from the pressure sensor in a first direction extending toward a first side in a horizontal direction;
- a third terminal protruding from the pressure sensor in a second direction extending toward a second side in the horizontal direction;
- a fourth terminal protruding from the pressure sensor in the second direction and electrically connected with the second terminal;
- a first capacitor disposed on the first side of the pressure sensor in the horizontal direction and connecting the first terminal and the second terminal;
- a second capacitor disposed on the second side of the pressure sensor in the horizontal direction and connecting the third terminal and the fourth terminal;
- a first lead line electrically connected with the first terminal and extending out of the sensor case from the first terminal toward the first side in the horizontal direction;
- a second lead line electrically connected with the second terminal and extending out of the sensor case from the second terminal toward the first side in the horizontal direction;
- a third lead line electrically connected with the third terminal, extending out of the sensor case from the third terminal toward the second side in the horizontal direction, and routed from the second side of the pressure sensor in the horizontal direction to the first side of the pressure sensor in the horizontal direction; and
- a guide that guides the third lead line from the second side of the pressure sensor in the horizontal direction to the first side of the pressure sensor in the horizontal direction; wherein
- the guide is disposed inside the sensor case; and
- the third lead line is guided to the first side of the pressure sensor in the horizontal direction through an inside of the sensor case by the guide.

8. The pressure sensor device for an electric pump according to claim 7, further comprising a guide that guides the third lead line from the second side of the pressure sensor in the horizontal direction to the first side of the pressure sensor in the horizontal direction; wherein
- the guide is disposed outside of the sensor case; and
- the third lead line is guided to the first side of the pressure sensor in the horizontal direction through the outside of the sensor case by the guide.

9. The pressure sensor device for an electric pump according to claim 7, wherein the guide includes a plurality of protrusions that protrude in the vertical direction orthogonal to the horizontal direction.

10. The pressure sensor device for an electric pump according to claim 9, wherein the plurality of protrusions include a pair of protrusions sandwiching the third lead line.

11. The pressure sensor device for an electric pump according to claim 9, wherein the plurality of protrusions include a protrusion disposed between the third terminal and the fourth terminal.

12. The pressure sensor device for an electric pump according to claim 9, wherein the plurality of protrusions include a sensor protrusion provided to the pressure sensor.

* * * * *